United States Patent
Li et al.

(10) Patent No.: US 9,571,413 B2
(45) Date of Patent: Feb. 14, 2017

(54) METHOD AND APPARATUS FOR IMPLEMENTING ROUND ROBIN SCHEDULING

(71) Applicant: Huawei Technologies Co., Ltd., Shenzhen, Guangdong (CN)

(72) Inventors: Dongchuan Li, Chengdu (CN); Guoming Shen, Shenzhen (CN); Xianqin Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 56 days.

(21) Appl. No.: 14/286,555

(22) Filed: May 23, 2014

(65) Prior Publication Data
US 2014/0376564 A1  Dec. 25, 2014

(30) Foreign Application Priority Data
Jun. 19, 2013  (CN) .......................... 2013 1 0244413

(51) Int. Cl.
*H04L 12/863* (2013.01)
*H04L 12/721* (2013.01)

(52) U.S. Cl.
CPC .......... *H04L 47/6225* (2013.01); *H04L 45/12* (2013.01); *H04L 45/72* (2013.01)

(58) Field of Classification Search
None
See application file for complete search history.

(56) References Cited

U.S. PATENT DOCUMENTS 6,470,017 B1 * 10/2002 Otaka ....................... H04J 3/24
370/395.71
2005/0243829 A1 * 11/2005 Spencer .............. H04L 12/5693
370/394

(Continued)

FOREIGN PATENT DOCUMENTS

CN      1507212 A      6/2004
CN      1507272 A      6/2004

(Continued)

OTHER PUBLICATIONS

Carr, Richard, "Fisher-Yates-Durstenfeld Shuffle", Blackwasp Software Development, http://www.blackwasp.co.uk/FisherYatesShuffle.aspx, Mar. 10, 2013.*

*Primary Examiner* — Faruk Hamza
*Assistant Examiner* — Cassandra Decker

(57) ABSTRACT

A method and an apparatus for implementing round robin scheduling are provided. The method includes: acquiring, from a queue, original location information of elements in the queue; performing location mapping processing on the original location information of the elements in the queue based on a set algorithm to obtain mapped location information of the elements in the queue, where the set algorithm or parameters used by the set algorithm change according to a set rule during each time of round robin scheduling; and starting from an element corresponding to a set initial location, performing round robin scheduling according to mapped queue sequences corresponding to the mapped location information of the elements. The method and the apparatus for implementing round robin scheduling can reduce the cost of storage devices and can ensure a balance in scheduling of elements in a service queue.

5 Claims, 4 Drawing Sheets

(56) References Cited

U.S. PATENT DOCUMENTS

| | | | | |
|---|---|---|---|---|
| 2005/0246452 A1* | 11/2005 | Spencer | ............. | H04L 12/5693 |
| | | | | 709/250 |
| 2007/0083897 A1* | 4/2007 | Brownell | ......... | G06F 17/30053 |
| | | | | 725/61 |
| 2013/0024936 A1* | 1/2013 | Jakobsson | ............. | G06F 21/554 |
| | | | | 726/23 |
| 2014/0359773 A1* | 12/2014 | Matthews | ............... | G06F 21/52 |
| | | | | 726/24 |

FOREIGN PATENT DOCUMENTS

| | | |
|---|---|---|
| CN | 102098217 A | 6/2011 |
| CN | 102315956 A | 1/2012 |

\* cited by examiner

METHOD AND APPARATUS FOR IMPLEMENTING ROUND ROBIN SCHEDULING

CROSS-REFERENCE TO RELATED APPLICATION

This application claims priority to Chinese Patent Application No. 201310244413.X, filed on Jun. 19, 2013, which is hereby incorporated by reference in its entirety.

TECHNICAL FIELD

Embodiments of the present invention relate to communications technologies, and in particular, to a method and an apparatus for implementing round robin scheduling.

BACKGROUND

Round robin scheduling is a scheduling manner for scheduling elements in a service queue by using a round robin method. To ensure a balance in round robin scheduling of the elements in the service queue, location information of a scheduled element when each time of round robin scheduling ends needs to be recorded, so as to use a next location following the location as a starting location of a next time of round robin scheduling.

In an actual application, generally one application service corresponds to multiple service queues, and each service queue further includes multiple service elements. In the prior art, when round robin scheduling is performed on the service elements in each service queue, generally a storage unit is allocated to each service queue. For example, in an application of a router, one router needs to perform traffic management on services of multiple users, and a service of each user further includes multiple types of service flows. To ensure quality of service for each user, bandwidth is allocated among the multiple types of service flows inside each user by means of round robin scheduling. It is assumed that one router can support use by 64K (64*1024) users at the same time, and each user has 8 types of service flows. In this case, a 3-bit storage unit needs to be allocated to each user, and 64K users need a total of 64K 3-bit storage units.

Therefore, in this solution for implementing round robin scheduling provided by the prior art, when there are a large quantity of users, a large quantity of storage units are needed to store ending location information of the corresponding round robin scheduling, leading to a high cost of storage devices.

SUMMARY

Embodiments of the present invention provide a method and an apparatus for implementing round robin scheduling, so as to reduce the cost of storage devices.

According to a first aspect, an embodiment of the present invention provides a method for implementing round robin scheduling, including:

acquiring, from a queue, original location information of elements in the queue;

performing location mapping processing on the original location information of the elements in the queue based on a set algorithm to obtain mapped location information of the elements in the queue, where the set algorithm or parameters used by the set algorithm change according to a set rule during each time of round robin scheduling; and starting from an element corresponding to a set initial location, performing round robin scheduling according to mapped queue sequences corresponding to the mapped location information of the elements.

In a first possible implementation manner of the first aspect, the performing location mapping processing on the original location information of the elements in the queue based on a set algorithm to obtain mapped location information of the elements in the queue includes:

performing a calculation according to the original location information of the elements in the queue by using a random algorithm, to obtain mapped locations corresponding to original locations, where the mapped locations are used as the mapped location information of the elements in the queue.

With reference to the first aspect or the first possible implementation manner of the first aspect, in a second possible implementation manner, the performing a calculation according to the original location information of the elements in the queue by using a random algorithm, to obtain mapped locations corresponding to original locations includes:

selecting a random value of this time of round robin scheduling according to the set rule, where the random value has a value range of 0 to $(2^n-1)$, and $2^n$ is a quantity of the elements in the queue;

calculating temporary locations of the elements in the queue according to the random value and the original locations of the elements in the queue, where a calculation formula is:

$$a\_tmp\_loc = a\_ori\_loc + random$$

where, random is the random value, $a\_ori\_loc$ is an original location of a queue element, and $a\_tmp\_loc$ is a temporary location of the queue element;

removing the most significant bit in a binary number of the temporary location, with n bits left; and reversing the n-bit binary number of the temporary location of the queue element, to obtain a mapped location of the queue element.

In a third possible implementation manner of the first aspect, the starting from an element corresponding to a set initial location, performing round robin scheduling according to mapped queue sequences corresponding to the mapped location information of the elements includes:

starting from an element at a starting location of the queue, performing round robin scheduling according to the mapped queue sequences corresponding to the mapped location information of the elements in the queue.

In a fourth possible implementation manner of the first aspect, after the performing round robin scheduling, the method further includes:

performing location restoration processing on the mapped location information of the round robin scheduled elements according to an inverse algorithm of the set algorithm, to obtain the original location information of the round robin scheduled elements; and obtaining, based on the original location information of the round robin scheduled elements, a result of the round robin scheduling of the queue elements.

According to a second aspect, an embodiment of the present invention provides an apparatus for implementing round robin scheduling, including:

a location acquiring module, configured to acquire, from a queue, original location information of elements in the queue;

a location mapping module, configured to perform location mapping processing on the original location information of the elements in the queue based on a set algorithm to obtain mapped location information of the elements in the queue, where the set algorithm or parameters used by the set algorithm change according to a set rule during each time of round robin scheduling; and a round robin scheduling module, configured to: starting from an element corresponding to a set initial location, perform round robin scheduling according to mapped queue sequences corresponding to the mapped location information of the elements.

In a first possible implementation manner of the second aspect, the location mapping module is specifically configured to perform a calculation according to the original location information of the elements in the queue by using a random algorithm, to obtain mapped locations corresponding to original locations, where the mapped locations are used as the mapped location information of the elements in the queue.

With reference to the second aspect or the first possible implementation manner of the second aspect, in a second possible implementation manner, the location mapping module includes:

a selecting unit, configured to select a random value of this time of round robin scheduling according to the set rule, where the random value has a value range of 0 to $(2^n-1)$, and $2^n$ is a quantity of the elements in the queue;

a calculating unit, configured to calculate temporary locations of the elements in the queue according to the random value and the original locations of the elements in the queue, where a calculation formula is:

$$a\_tmp\_loc = a\_ori\_loc + random$$

where, random is the random value, $a\_ori\_loc$ is an original location of a queue element, and $a\_tmp\_loc$ is a temporary location of the queue element;

a bit removing unit, configured to remove the most significant bit in a binary number of the temporary location, with n bits left; and a reversing unit, configured to reverse the n-bit binary number of the temporary location of the queue element, to obtain a mapped location of the queue element.

In a third possible implementation manner of the second aspect, the round robin scheduling module is specifically configured to: starting from an element at a starting location of the queue, perform round robin scheduling according to the mapped queue sequences corresponding to the mapped location information of the elements in the queue.

In a fourth possible implementation manner of the second aspect, the apparatus further includes:

a location restoring module, configured to perform location restoration processing on the mapped location information of the round robin scheduled elements according to an inverse algorithm of the set algorithm, to obtain the original location information of the round robin scheduled elements; and a result obtaining module, configured to obtain, based on the original location information of the round robin scheduled elements, a result of the round robin scheduling of the queue elements.

In the technical solutions provided in the embodiments of the present invention, from a queue, original location information of elements in the queue is acquired, location mapping processing is performed on the original location information of the elements in the queue based on a set algorithm to obtain mapped location information of the elements in the queue, and then, starting from an element corresponding to a set initial location, round robin scheduling is performed according to mapped queue sequences corresponding to the mapped location information of the elements. Since the location information of the round robin scheduled elements does not need to be stored and recorded, the cost of storage devices is reduced; and since the set algorithm or parameters used by the algorithm continuously change, mapped locations continuously change accordingly, which can ensure a balance in scheduling of the elements in the queue.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

To make the objectives, technical solutions, and advantages of the present invention clearer, the following clearly describes the technical solutions in the present invention with reference to the accompanying drawings in the present invention. Apparently, the described embodiments are a part rather than all of the embodiments of the present invention. All other embodiments obtained by persons of ordinary skill in the art based on the embodiments of the present invention without creative efforts shall fall within the protection scope of the present invention.

Method Embodiment 1

Figure 1:
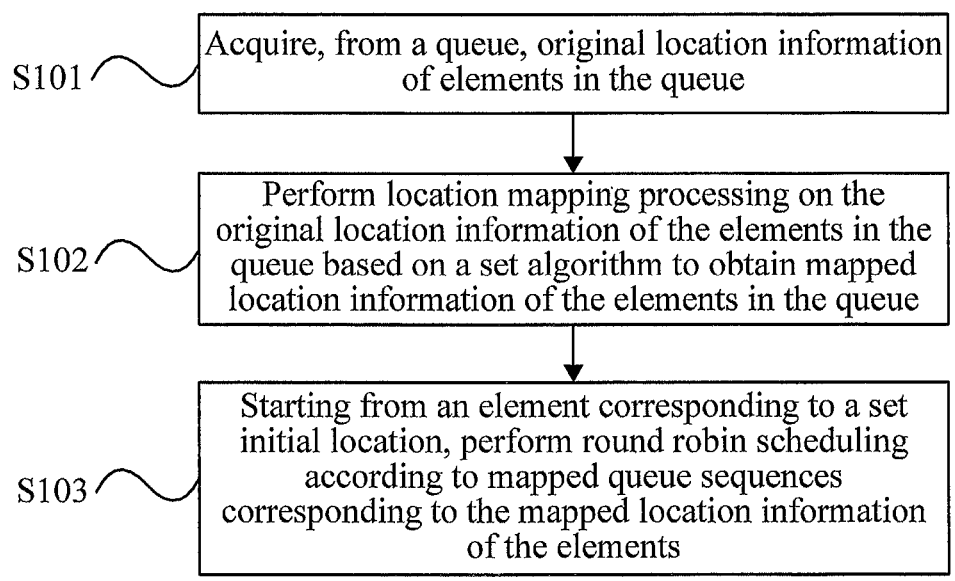
FIG. 1 is a flowchart of Embodiment 1 of a method for implementing round robin scheduling according to the present invention.

FIG. 1 is a flowchart of Embodiment 1 of a method for implementing round robin scheduling according to the present invention. The method for implementing round robin scheduling in this embodiment is applicable to an application where round robin scheduling is performed on elements in a queue that need to be scheduled. The method may be performed by an apparatus for implementing round robin scheduling, and the apparatus for implementing round robin scheduling may be integrated in a router, and may also be borne by another independent network element device. As shown in FIG. 1, the method in this embodiment may include:

S101: Acquire, from a queue, original location information of elements in the queue.

When performing round robin scheduling on elements in a queue, the apparatus for implementing round robin scheduling first acquires original location information of elements in a service queue in the service queue, which, for example, may be queue sequence numbers of the elements in the queue.

S102: Perform location mapping processing on the original location information of the elements in the queue based on a set algorithm to obtain mapped location information of the elements in the queue, where the set algorithm or parameters used by the set algorithm change according to a set rule during each time of round robin scheduling.

Specifically, a location mapping processing algorithm such as a random algorithm may be used to perform location mapping on the original location information of the elements in the queue, to map the elements in the queue to different locations. The algorithm used in each time of round robin scheduling may be set to change according to the rule, and the parameter of the algorithm may also be set to change according to the rule. For the random algorithm, a random number may be set to change according to the rule.

S103: Starting from an element corresponding to a set initial location, perform round robin scheduling according to mapped queue sequences corresponding to the mapped location information of the elements.

After the location mapping processing is performed on the original location information of the elements in the queue, round robin scheduling is performed on the queue elements based on the mapped location information of the elements in the queue. Specifically, each time round robin scheduling is performed on a queue element, a set scheduling location may be selected, and therefore location information of the round robin scheduled elements does not need to be stored and recorded. The technical solution in this embodiment is particularly applicable to the service queue, for example, in an application scenario of a router, round robin scheduling is performed on elements of the service queue of a user. Because before round robin scheduling is performed each time, the location mapping processing is performed on the original location information of the elements in the service queue, and the used algorithm or parameters change according to the set rule; therefore, different mapped queues may be obtained, and thereby a balance in scheduling of the elements in the queue can be ensured.

In this embodiment, from a queue, original location information of elements in the queue is acquired, location mapping processing is performed on the original location information of the elements in the queue based on a set algorithm to obtain mapped location information of the elements in the queue, and then, starting from an element corresponding to a set initial location, round robin scheduling is performed according to mapped queue sequences corresponding to the mapped location information of the elements. Since the location information of the round robin scheduled elements does not need to be stored and recorded, the cost of storage devices is reduced, and a balance in scheduling of the elements in the queue can be ensured.

In the method for implementing round robin scheduling that is described above, the performing location mapping processing on the original location information of the elements in the queue based on a set algorithm to obtain mapped location information of the elements in the queue includes:

performing a calculation according to the original location information of the elements in the queue by using a random algorithm, to obtain mapped locations corresponding to original locations, where the mapped locations are used as the mapped location information of the elements in the queue.

Specifically, the random algorithm that is easily implemented by hardware may be used to perform randomization processing on locations of the queue elements. That is, before each time of round robin scheduling, the elements in the queue are randomly mapped to different locations by using the random algorithm, and round robin scheduling is performed based on the mapped location information. Further, different random numbers may be used in the random algorithm, so that a different mapped location order is obtained each time the queue elements are mapped, and thereby a balance in scheduling of the elements in the queue is ensured.

In this embodiment, location mapping processing is performed on original location information of elements in a queue by using a random algorithm to obtain mapped location information of the elements in the queue, and round robin scheduling is performed on the queue elements based on the mapped location information of the elements in the queue, so that location information of the round robin scheduled elements does not need to be stored and recorded. In addition, since a different random number may be used each time location mapping processing is performed by using the random algorithm, a different mapped location order is obtained each time the queue elements are mapped. Therefore, the technical solution provided in this embodiment not only can reduce the cost of storage devices, but also can ensure a balance in scheduling of the elements in the queue.

In the method for implementing round robin scheduling that is described above, the starting from an element corresponding to a set initial location, performing round robin scheduling according to mapped queue sequences corresponding to the mapped location information of the elements includes:

starting from an element at a starting location of the queue, performing round robin scheduling according to the mapped queue sequences corresponding to the mapped location information of the elements in the queue.

Specifically, each time round robin is performed, round robin scheduling is performed, starting from an element at a starting location of the queue, based on a mapped location order of the elements in the service queue. Typically, only a service or a packet that is stored inside one element is scheduled each time. If no service or packet currently exists inside the starting location, round robin scheduling proceeds to the next mapped location to find whether the element stores a service or a packet needing to be scheduled. For an element that has been scheduled, the element at this location can be filled by a subsequently coming service, packet, or the like needing to be scheduled. A different mapped queue is obtained each time location mapping processing is performed, and by adjusting a mapping processing algorithm, elements at locations in the mapped queue after the mapping may be enabled to randomly change; therefore a balance in scheduling of the elements in the queue can be ensured.

Method Embodiment 2

Figure 2:
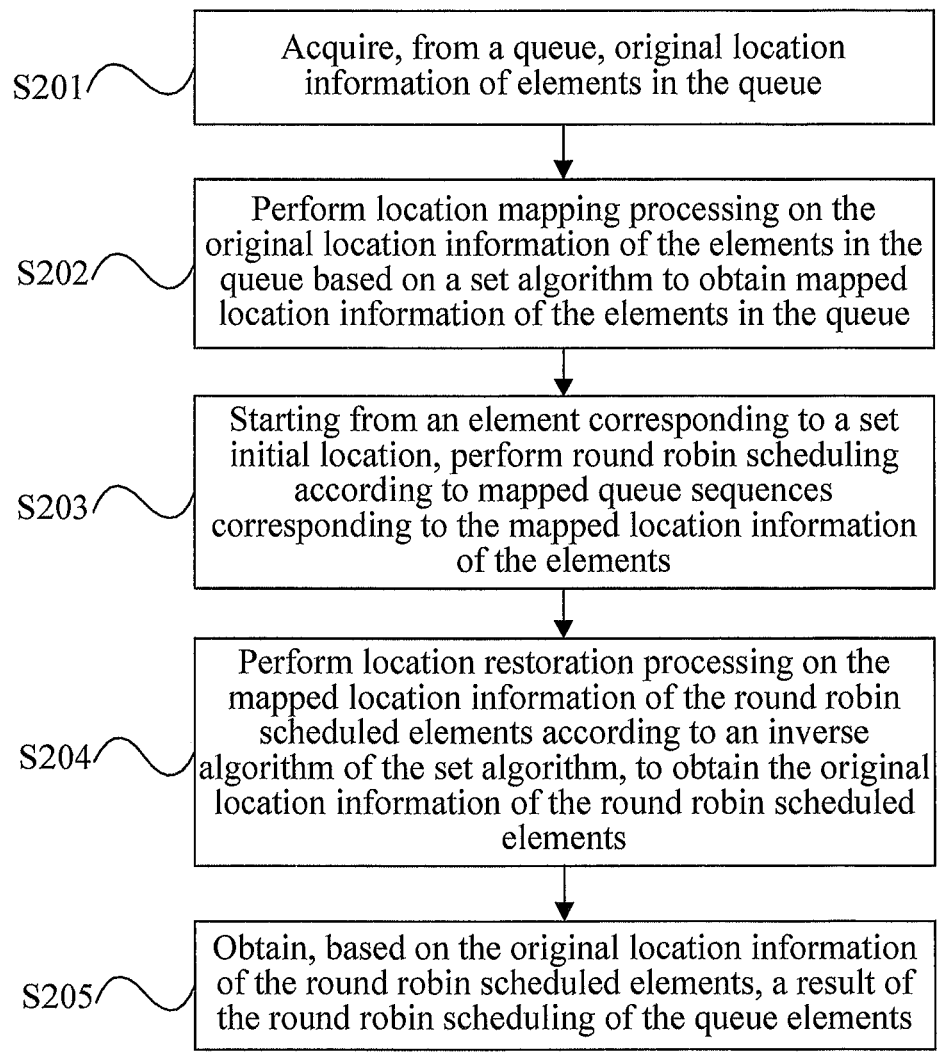
FIG. 2 is a flowchart of Embodiment 2 of a method for implementing round robin scheduling according to the present invention.

FIG. 2 is a flowchart of Embodiment 2 of a method for implementing round robin scheduling according to the present invention. As shown in FIG. 2, the method in this embodiment may include:

S201: Acquire, from a queue, original location information of elements in the queue.

Specifically, an execution method of S201 is similar to the execution method of S101 in the foregoing Embodiment 1 of the method for implementing round robin scheduling, and the details are not repeated herein.

S202: Perform location mapping processing on the original location information of the elements in the queue based on a set algorithm to obtain mapped location information of the elements in the queue.

Specifically, an execution method of S202 is similar to the execution method of S102 in the foregoing Embodiment 1 of the method for implementing round robin scheduling, and the details are not repeated herein.

S203: Starting from an element corresponding to a set initial location, perform round robin scheduling according to mapped queue sequences corresponding to the mapped location information of the elements.

Specifically, an execution method of S203 is similar to the execution method of S103 in the foregoing Embodiment. 1 of the method for implementing round robin scheduling, and the details are not repeated herein.

S204: Perform location restoration processing on the mapped location information of the round robin scheduled elements according to an inverse algorithm of the set algorithm, to obtain the original location information of the round robin scheduled elements.

An apparatus for implementing round robin scheduling performs round robin scheduling on the queue elements based on mapped locations of the queue elements, and after completing the scheduling, may re-obtain the original location information of the scheduled elements by using an inverse operation of a location mapping processing algorithm.

S205: Obtain, based on the original location information of the round robin scheduled elements, a result of the round robin scheduling of the queue elements.

After performing round robin scheduling on the queue elements based on the mapped locations of the queue elements, the apparatus for implementing round robin scheduling needs to present a result of the round robin scheduling of the elements in the service queue based on real location information of the round robin scheduled elements. For example, in an application of a router, after an original location is obtained according to a mapped location, the router is notified of the original location, and the router may perform a sending operation on an element at the original location. The result of the round robin scheduling is a certain type of service flow of a certain user, and the router sends the service flow from an input port of the router to an output port of the router based on the round robin result.

In this embodiment, after round robin scheduling on the queue elements is completed, location restoration processing is performed on the mapped location information of the round robin scheduled elements, and a result of the round robin scheduling on the queue element is obtained based on the original location information of the round robin scheduled elements. Since location information of the round robin scheduled elements does not need to be stored and recorded, the cost of storage devices is reduced, and a balance in scheduling of the elements in the queue can be ensured.

Method Embodiment 3

In this embodiment, after acquiring, from a queue, original location information of elements in the queue, an apparatus for implementing round robin scheduling performs location mapping processing on the original location information of the elements in the queue by using a random algorithm. Description is given below with reference to a specific example.

Exemplarily, first, a random value of this time of round robin scheduling is selected according to the set rule, where the random value has a value range of 0 to $(2^n-1)$, and $2^n$ is a quantity of the elements in the queue.

For example, it is assumed that round robin scheduling needs to be performed on a queue Q including $2^n$ elements. In this embodiment, it is assumed that n is 2, that is, round robin scheduling is performed on a queue Q including 4 elements a0, a1, a2, and a3, where a0 is located at location 0 of the queue, a1 is located at location 1 of the queue, a2 is located at location 2 of the queue, and a3 is located at location 3 of the queue. It may be set that a random number random generated by a pseudo-random number generator is used as a random value for performing location mapping calculation on the original location information of the elements in the queue, where the random number has a value range of 0 to $(2^n-1)$, and when n is 2, the value range of random is set to 0 to 3.

Second, temporary locations of the elements in the queue are calculated according to the random value and original locations of the elements in the queue, where a calculation formula is:

$$a\_tmp\_loc = a\_ori\_loc + random$$

where, random is the random value, a_ori_loc is an original location of a queue element, and a_tmp_loc is a temporary location of the queue element.

The most significant bit in a binary number of the temporary location is removed, with n bits left, where, value ranges of a_ori_loc and a_tmp_loc are 0 to $(2^n-1)$, and when a_ori_loc and a_tmp_loc are expressed in a binary form, a bit width is n. If a bit width of a reversed binary number of the temporary location exceeds n after the random number is added, the most significant bit is removed. In this example, n is 2, and a_ori_loc and a_tmp_loc are expressed in a binary form as a_ori_loc [1:0] and a_tmp_loc[1:0].

Specifically, for example, in the foregoing example, by adding random to location values of the elements a0, a1, a2, and a3 separately, temporary location information of a0, a1, a2, and a3 are obtained, which are respectively named a0_tmp_loc, a1_tmp_loc, a2_tmp_loc, and a3_tmp_loc, and accordingly, $$a0\_tmp\_loc = 0 + random;$$

$$a1\_tmp\_loc = 1 + random;$$

$$a2\_tmp\_loc = 2 + random;\ and$$

$$a3\_tmp\_loc = 3 + random.$$

Then, the n-bit binary number of the temporary location of the queue element is reversed, to obtain a mapped location of the queue element.

Specifically, for example, in the foregoing example, it is assumed that temporary locations a0_tmp_loc, a1_tmp_loc, a2_tmp_loc, and a3_tmp_loc of a0, a1, a2, and a3 are expressed in a binary form as a0_tmp_loc[1:0], a1_tmp_loc[1:0], a2_tmp_loc[1:0], and a3_tmp_loc[1:0], and binarys of the temporary locations of a0, a1, a2, and a3 are reversed, to obtain mapped locations of the queue elements, which are respectively named a0_sch_loc, a1_sch_loc, a2_sch_loc, and a3_sch_loc, and accordingly, a0_sch_loc={a0_tmp_loc[0], a0_tmp_loc[1]};

a1_sch_loc={a1_tmp_loc[0], a1_tmp_loc[1]};

a2_sch_loc={a2_tmp_loc[0], a2_tmp_loc[1]}; and a3_sch_loc={a3_tmp_loc[0], a3_tmp_loc[1]}.

Table 1 is an element-location mapping table of the queue Q when random=0; Table 2 is an element-location mapping table of the queue Q when random=1; Table 3 is an element-location mapping table of the queue Q when random=2; and Table 4 is an element-location mapping table of the queue Q when random=3.

TABLE 1

| Queue Element | Original Location (Decimal) | Temporary Location (Decimal) | Temporary Location (Binary) | Mapped location (Binary) | Mapped location (Decimal) |
|---|---|---|---|---|---|
| a0 | 0 | 0 | 00 | 00 | 0 |
| a1 | 1 | 1 | 01 | 10 | 2 |
| a2 | 2 | 2 | 10 | 01 | 1 |
| a3 | 3 | 3 | 11 | 11 | 3 |

TABLE 2

| Queue Element | Original Location (Decimal) | Temporary Location (Decimal) | Temporary Location (Binary) | Mapped location (Binary) | Mapped location (Decimal) |
|---|---|---|---|---|---|
| a0 | 0 | 1 | 01 | 10 | 2 |
| a1 | 1 | 2 | 10 | 01 | 1 |
| a2 | 2 | 3 | 11 | 11 | 3 |
| a3 | 3 | 4 | 00 | 00 | 0 |

TABLE 3

| Queue Element | Original Location (Decimal) | Temporary Location (Decimal) | Temporary Location (Binary) | Mapped location (Binary) | Mapped location (Decimal) |
|---|---|---|---|---|---|
| a0 | 0 | 2 | 10 | 01 | 1 |
| a1 | 1 | 3 | 11 | 11 | 3 |
| a2 | 2 | 4 | 00 | 00 | 0 |
| a3 | 3 | 5 | 01 | 10 | 2 |

TABLE 4

| Queue Element | Original Location (Decimal) | Temporary Location (Decimal) | Temporary Location (Binary) | Mapped location (Binary) | Mapped location (Decimal) |
|---|---|---|---|---|---|
| a0 | 0 | 3 | 11 | 11 | 3 |
| a1 | 1 | 4 | 00 | 00 | 0 |
| a2 | 2 | 5 | 01 | 10 | 2 |
| a3 | 3 | 6 | 10 | 01 | 1 |

Figure 3:
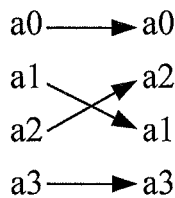
FIG. 3 to FIG. 6 are schematic diagrams of location mapping of elements in a service queue.
Figure 4:
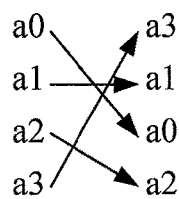
Figure 5:
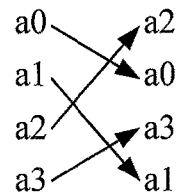
Figure 6:
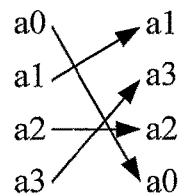

FIG. 3 to FIG. 6 are schematic diagrams of location mapping of elements in a queue. In the foregoing example, referring to Table 1, FIG. 3 shows mapped locations that are obtained after the queue elements are mapped by using the random algorithm when random=0; referring to Table 2, FIG. 4 shows mapped locations that are obtained after the queue elements are mapped by using the random algorithm when random=1; referring to Table 3, FIG. 5 shows mapped locations that are obtained after the queue elements are mapped by using the random algorithm when random=2; and referring to Table 4, FIG. 6 shows mapped locations that are obtained after the queue elements are mapped by the random algorithm when random=3. Each time round robin is performed, it is assumed, based on a mapped location order of the queue elements, to perform round robin scheduling on the queue elements, starting from location 0. In this case, when random=0, the scheduled element is a0; when random=1, the scheduled element is a3; when random=2, the scheduled element is a2; and when random=3, the scheduled element is a1.

After the scheduling is completed, an original location value of the scheduled element may be obtained by using an inverse calculation of the random algorithm, to finally obtain a result of the current round robin scheduling.

In this embodiment, a random value is selected according to a set rule, temporary locations of elements in a queue are calculated according to the random value and original locations of the elements in the queue, binarys of the temporary location of a queue element are reversed to obtain a mapped location of the queue element, and finally round robin scheduling is performed on the queue elements based on mapped location information of the elements in the queue. In this way, location information of the round robin scheduled elements does not need to be stored and recorded. In addition, since a different random value may be used each time location mapping processing is performed, a different mapped location order is obtained each time the queue elements are mapped. Therefore, the technical solution provided in this embodiment not only can reduce the cost of storage devices, but also can ensure a balance in scheduling of the elements in the queue.

Figure 7:
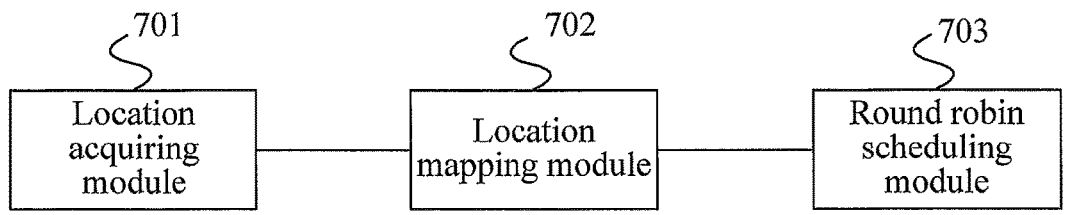
FIG. 7 is a schematic structural diagram of Embodiment 1 of an apparatus for implementing round robin scheduling according to the present invention.

FIG. 7 is a schematic structural diagram of Embodiment 1 of an apparatus for implementing round robin scheduling according to the present invention. As shown in FIG. 7, the apparatus in this embodiment may include: a location acquiring module 701, a location mapping module 702, and a round robin scheduling module 703. The location acquiring module 701 is configured to acquire, from a queue, original location information of elements in the queue; the location mapping module 702 is configured to perform location mapping processing on the original location information of the elements in the queue based on a set algorithm to obtain mapped location information of the elements in the queue, where the set algorithm or parameters used by the set algorithm change according to a set rule during each time of round robin scheduling; and the round robin scheduling module 703 is configured to: starting from an element corresponding to a set initial location, perform round robin scheduling according to mapped queue sequences corresponding to the mapped location information of the elements.

The apparatus for implementing round robin scheduling in this embodiment may be configured to execute the method in the method embodiment shown in FIG. 1, and have corresponding functional modules. The implementation principle of and the technical effect that needs to be achieved by the apparatus are similar to those of the method, and the details are not repeated herein.

In the apparatus described above, the location mapping module 702 may be specifically configured to perform a calculation according to the original location information of the elements in the queue by using a random algorithm, to obtain mapped locations corresponding to original locations, where the mapped locations are used as the mapped location information of the elements in the queue.

The implementation principle of and the technical effect that needs to be achieved by the apparatus for implementing round robin scheduling in this embodiment have been described above, and the details are not repeated herein.

In the apparatus described above, the round robin scheduling module 703 may be specifically configured to: starting from an element at a starting location of the queue, perform round robin scheduling according to the mapped queue sequences corresponding to the mapped location information of the elements in the queue.

The implementation principle of and the technical effect that needs to be achieved by the apparatus for implementing round robin scheduling in this embodiment have been described above, and the details are not repeated herein.

Figure 8:
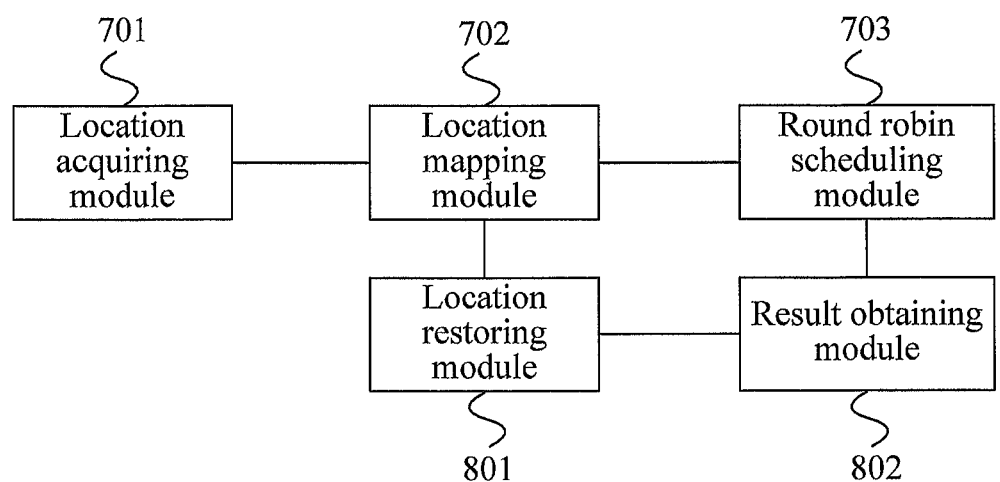
FIG. 8 is a schematic structural diagram of Embodiment 2 of an apparatus for implementing round robin scheduling according to the present invention.

FIG. 8 is a schematic structural diagram of Embodiment 2 of an apparatus for implementing round robin scheduling according to the present invention. As shown in FIG. 8, the apparatus in this embodiment may further include:

a location restoring module 801, configured to perform location restoration processing on the mapped location information of the round robin scheduled elements according to an inverse algorithm of the set algorithm, to obtain the original location information of the round robin scheduled elements; and a result obtaining module 802, configured to obtain, based on the original location information of the round robin scheduled elements, a result of the round robin scheduling of the queue elements.

The apparatus for implementing round robin scheduling in this embodiment may be configured to execute the method in the method embodiment shown in FIG. 2, and have corresponding functional modules. The implementation principle of and the technical effect that needs to be achieved by the apparatus are similar to those of the method, and the details are not repeated herein.

In the apparatus described above, the location mapping module 702 includes: a selecting unit, a calculating unit, a bit removing unit, and a reversing unit. The selecting unit is configured to select a random value of this time of round robin scheduling according to the set rule, where the random value has a value range of 0 to $(2^n-1)$ and $2^n$ is a quantity of the elements in the queue; the calculating unit is configured to calculate temporary locations of the elements in the queue according to the random value and the original locations of the elements in the queue, where a calculation formula is:

$$a\_tmp\_loc = a\_ori\_loc + random$$

where, random is the random value, a_ori_loc is an original location of a queue element, and a_tmp_loc is a temporary location of the queue element;

the bit removing unit is configured to remove the most significant bit in a binary number of the temporary location, with n bits left; and the reversing unit is configured to reverse the n-bit binary number of the temporary location of the queue element, to obtain a mapped location of the queue element.

The implementation principle of and the technical effect that needs to be achieved by the apparatus for implementing round robin scheduling in this embodiment have been described above, and the details are not repeated herein.

Figure 9:
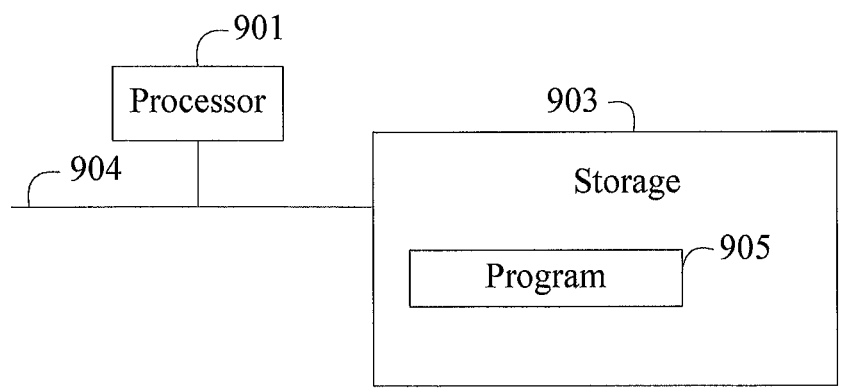
FIG. 9 is a schematic structural diagram of a network element device according to an embodiment of the present invention.

FIG. 9 is a schematic structural diagram of a network element device according to an embodiment of the present invention. As shown in FIG. 9, the network element device includes at least one processor 901 (for example, a CPU), a storage 903, and at least one communication bus 904 that is configured to implement connection and communication between apparatuses. The processor 901 is configured to execute an executable module, such as a computer program, stored in the storage 903. The storage 903 may include a high-speed random access memory (RAM: Random Access Memory) and may further include a non-volatile memory (non-volatile memory), for example, at least one disk storage.

In some implementation manners, the storage 903 stores a program 905, and the program. 905 is executable by the processor 901. This program includes executing a method for implementing round robin scheduling, where the method includes:

acquiring, from a queue, original location information of elements in the queue;

performing location mapping processing on the original location information of the elements in the queue based on a set algorithm to obtain mapped location information of the elements in the queue, where the set algorithm or parameters used by the set algorithm change according to a set rule during each time of round robin scheduling; and starting from an element corresponding to a set initial location, performing round robin scheduling according to mapped queue sequences corresponding to the mapped location information of the elements.

In the foregoing program for executing the method for implementing round robin scheduling, exemplarily, the performing location mapping processing on the original location information of the elements in the queue based on a set algorithm to obtain mapped location information of the elements in the queue includes:

performing a calculation according to the original location information of the elements in the queue by using a random algorithm, to obtain mapped locations corresponding to original locations, where the mapped locations are used as the mapped location information of the elements in the queue.

In the foregoing program for executing the method for implementing round robin scheduling, exemplarily, the performing a calculation according to the original location information of the elements in the queue by using a random algorithm, to obtain mapped locations corresponding to original locations includes:

selecting a random value of this time of round robin scheduling according to the set rule, where the random value has a value range of 0 to $(2^n-1)$, and $2^n$ is a quantity of the elements in the queue;

calculating temporary locations of the elements in the queue according to the random value and the original locations of the elements in the queue, where a calculation formula is:

$$a\_tmp\_loc = a\_ori\_loc + random$$

where, random is the random value, a_ori_loc is an original location of a queue element, and a_tmp_loc is a temporary location of the queue element;

removing the most significant bit in a binary number of the temporary location, with n bits left; and reversing the n-bit binary number of the temporary location of the queue element, to obtain a mapped location of the queue element.

In the foregoing program for executing the method for implementing round robin scheduling, exemplarily, the starting from an element corresponding to a set initial location, performing round robin scheduling according to mapped queue sequences corresponding to the mapped location information of the elements includes:

starting from an element at a starting location of the queue, performing round robin scheduling according to the mapped queue sequences corresponding to the mapped location information of the elements in the queue.

In the foregoing program for executing the method for implementing round robin scheduling, exemplarily, after the performing round robin scheduling, the following is further included:

performing location restoration processing on the mapped location information of the round robin scheduled elements according to an inverse algorithm of the set algorithm, to obtain the original location information of the round robin scheduled elements; and obtaining, based on the original location information of the round robin scheduled elements, a result of the round robin scheduling of the queue elements.

Finally, it should be noted that the foregoing embodiments are merely intended for describing the technical solutions of the present invention rather than limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, as long as such modifications and replacements do not cause the essence of corresponding technical solutions to depart from the scope of the technical solutions of the embodiments of the present invention.

What is claimed is:

1. A method for implementing round robin scheduling performed by a network element, comprising:
    acquiring, from a queue and by the network element, respective original location information of elements in the queue;
    performing location mapping processing by the network element on the respective original location information of the elements in the queue based on a set algorithm to obtain respective mapped location information of the elements in the queue, wherein the set algorithm or parameters used by the set algorithm change according to a set rule during each time of round robin scheduling;
    starting from an element corresponding to a set initial location, performing the round robin scheduling by the network element according to mapped queue sequences corresponding to the respective mapped location information of the elements; and
    routing data by the network element according to the round robin scheduling,
    wherein performing the location mapping processing on the respective original location information of the elements in the queue comprises:
    performing a calculation according to the respective original location information of the elements in the queue by using a random algorithm by the network element, to obtain respective mapped locations corresponding to respective original locations, wherein the respective mapped locations are used as the respective mapped location information of the elements in the queue, wherein performing the calculation according to the respective original location information of the elements in the queue comprises:
    selecting a random value of round robin scheduling according to the set rule by the network element, wherein the random value has a value range of 0 to $(2^n-1)$, and $2^n$ is a quantity of the elements in the queue;
    calculating respective temporary locations of the elements in the queue according to the random value and the respective original locations of the elements in the queue, by the network element, wherein a calculation formula is:

$$a\_tmp\_loc = a\_ori\_loc + random$$

wherein, random is the random value, a_ori_loc is an original location of a queue element, and a_tmp_loc is a temporary location of the queue element;
    removing the most significant bit in a binary number of the temporary location, with n bits left; and
    reversing the n-bit binary number of the temporary location of the queue element, to obtain a mapped location of the queue element.

2. The method for implementing round robin scheduling according to claim 1, wherein performing the round robin scheduling comprises:
    starting from an element at a starting location of the queue, performing the round robin scheduling according to the mapped queue sequences corresponding to the respective mapped location information of the elements in the queue.

3. The method for implementing round robin scheduling according to claim 1, after performing the round robin scheduling, further comprising:
    performing location restoration processing on the respective mapped location information of round robin scheduled elements according to an inverse algorithm of the set algorithm, to obtain the respective original location information of the round robin scheduled elements; and
    obtaining, based on the respective original location information of the round robin scheduled elements, a result of the round robin scheduling of the queue elements, wherein the result of the round robin scheduling comprises a type of service flow of a user.

4. An apparatus for implementing round robin scheduling, comprising:
    a memory, coupled to at least one processor;
    the at least one processor configured
    to execute a program stored in the memory to acquire, from a queue, respective original location information of elements in the queue,
    to perform location mapping processing on the respective original location information of the elements in the queue based on a set algorithm to obtain respective mapped location information of the elements in the queue, wherein the set algorithm or parameters used by the set algorithm change according to a set rule during each time of round robin scheduling, and starting from an element corresponding to a set initial location,
    to perform the round robin scheduling according to mapped queue sequences corresponding to the respective mapped location information of the elements, and
    to route data according to the round robin scheduling,
    wherein the at least one processor is configured
    to perform a calculation according to the respective original location information of the elements in the queue by using a random algorithm,
    to obtain respective mapped locations corresponding to respective original locations, wherein the respective mapped locations are used as the respective mapped location information of the elements in the queue,
    wherein the at least one processor is configured to:
    select a random value of round robin scheduling according to the set rule, wherein the random value has a value range of 0 to $(2^n-1)$, and $2^n$ is a quantity of the elements in the queue;

calculate respective temporary locations of the elements in the queue according to the random value and the respective original locations of the elements in the queue, wherein a calculation formula is:

a_tmp_loc=a_ori_loc +random wherein random is the random value, a_ori_loc is an original location of a queue element, and a_tmp_loc is a temporary location of the queue element;

remove the most significant bit in a binary number of the temporary location, with n bits left; and reverse the n-bit binary number of the temporary location of the queue element, to obtain a mapped location of the queue element.

5. The apparatus for implementing round robin scheduling according to claim 4, wherein the at least one processor is configured to:

starting from an element at a starting location of the queue, perform the round robin scheduling according to the mapped queue sequences corresponding to the respective mapped location information of the elements in the queue.

\* \* \* \* \*